(12) United States Patent
Moran et al.

(10) Patent No.: US 6,940,818 B2
(45) Date of Patent: Sep. 6, 2005

(54) SELECTABLE BANDWIDTH FACILITY FOR A NETWORK PORT

(75) Inventors: Paul J Moran, Hemel Hempstead (GB); Peter J Wilson, Welwyn Garden (GB); David J Law, Edinburgh (GB)

(73) Assignee: 3Com Corporation, Santa Clara, CA (US)

(*) Notice: Subject to any disclaimer, the term of this patent is extended or adjusted under 35 U.S.C. 154(b) by 856 days.

(21) Appl. No.: 09/888,425

(22) Filed: Jun. 26, 2001

(65) Prior Publication Data

US 2002/0071398 A1 Jun. 13, 2002

(30) Foreign Application Priority Data

Dec. 13, 2000 (GB) .............................................. 0030600

(51) Int. Cl.$^7$ .......................... H04L 12/26; H04L 12/56
(52) U.S. Cl. ..................... 370/235.1; 370/236
(58) Field of Search .................. 370/252, 230, 370/230.1, 235.1, 389; 709/235, 226

(56) References Cited

U.S. PATENT DOCUMENTS

| | | | | | |
|---|---|---|---|---|---|
| 5,339,332 | A | * | 8/1994 | Kammerl | 375/225 |
| 5,604,867 | A | * | 2/1997 | Harwood | 709/233 |
| 5,673,254 | A | * | 9/1997 | Crayford | 370/231 |
| 5,859,837 | A | * | 1/1999 | Crayford | 370/230 |
| 5,983,278 | A | * | 11/1999 | Chong et al. | 709/235 |
| 6,046,979 | A | * | 4/2000 | Bauman | 370/229 |
| 6,141,323 | A | * | 10/2000 | Rusu et al. | 370/236 |
| 6,192,028 | B1 | * | 2/2001 | Simmons et al. | 370/229 |
| 6,804,194 | B1 | * | 10/2004 | Kadambi et al. | 370/229 |

* cited by examiner

*Primary Examiner*—Hassan Kizou
*Assistant Examiner*—Hong Sol Cho
(74) *Attorney, Agent, or Firm*—Nixon & Vanderhye P.C.

(57) ABSTRACT

Traffic through a port of a network switch is monitored and controlled by a token bucket system having a duplex mode in which the bandwidths available for incoming and outgoing packets are controlled by a single token bucket and a half-duplex mode in which the bandwidths for incoming and outgoing packets are controlled by a respective one of two token buckets.

4 Claims, 2 Drawing Sheets

SELECTABLE BANDWIDTH FACILITY FOR A NETWORK PORT

FIELD OF THE INVENTION

This invention relates to data communication networks for the conveyance of data packets between users, such as computers, file servers, work stations and such like Networks of this character are commonly composed not only of the end users but also various multiport units such as hubs, switches and routers

BACKGROUND OF THE INVENTION

Some of the units from which a network is composed are essentially passive in the sense that they are intended merely to pass on or distribute without discrimination packets that they receive Other units, particularly bridges and routers, are more complex devices and commonly include management agents by means of which control over the data packets passing through the switch may be exercised In recent years many developments have occurred in the implementation of packet based networks and in particular in networks conforming to the 'Ethernet' Standards For example, the permitted maximum speeds of communication which can be achieved have increased and standards are now in existence which permit communications to occur at a variety of different speeds Devices are available which are capable of operating at a multiplicity of different rates, such as for example 10 or 100 or 1000 Mbps selectively It is known to provide on network units ports, and associated media access control devices (MACs) which are selectively controllable to operate at any one of a variety of different speeds so that a user may take advantage of a multiplicity of different operating capabilities Nevertheless, it is for a variety of reasons desirable to be able to restrict arbitrarily the bandwidth available to a user to some figure less than the rate or selected rate at which a communication link could operate For example, many network administrators do not desire their users to have access to high speed networks because allowing such access may dramatically increase the load on existing file servers, routers and wide area network links These reasons may be sufficient to prevent network administrators from installing multiple speed switches It is therefore generally desirable to provide a feature that can put an upper limit on the bandwidth permitted at an individual port of a switch For example, a network administrator may install a switch that is capable at individual ports of operation at a multiplicity of different rates, such as 10 Mbps and 100 Mbps, but configure the switch such that certain ports are limited to an actual throughput of (for example) 6 Mbps and other ports are limited to 20 Mbps

GENERAL STATE OF THE ART

It is known to limit the bandwidth available for packets to be transmitted over a link from a port by using a 'leaky bucket' which is decremented at a selectable rate and is incremented at a rate dependant on the traffic (ie the packets) dispatched from the port Transmission of packets is inhibited if the value held in the counter exceeds a threshold Such a system is disclosed by Harwood in U.S. Pat. No. 5,604,867 issued 18 Feb. 1997 It is also known to provide a system in which a peak bit rate is monitored in a first 'leaky bucket' unit and the duration of peak rate bursts is monitored in a second 'leaky bucket' Such an arrangement is shown in Kammerl, U.S. Pat. No. 5,339,332

It is also known to provide a 'leaky bucket' which is decremented at a selectable rate and is incremented in accordance with traffic both sent from and received by a respective port of a switch. Such a system is disclosed in GB published application GB-2336076

It is customary in devices such as network switches, bridges and routers to store packets after they have been received and before they are transmitted from their destination port or ports Very typically the packets are held in queues, constituted by the packet themselves or by queues of pointers for the packets, and it is well known to control the dispatch of packets from a queue either in accordance with conditions within the switch or by virtue of control frames received at a particular port Accordingly, there is in most commercially available switches a mechanism which enables the transmission of switches from a particular port to be selectively inhibited It is also known to restrict the reception of packets at a particular port In the present invention a reduction in bandwidth of packets received by the switch, is preferably achieved by inhibiting the reception of packets by signalling to a link partner, i e the provider of packets at the other end of a link to a particular port This activity is well known in the art and is, for example, specified in a transmission standard such as IEEE 802 3 (1998 Edition) for Ethernet packets In that standard, the sending of a particular control frame with a conventional address and particular operation code must, according to the standard, be interpreted by a receiver of such a frame (i e the link partner) as an instruction to cease sending frames or packets for a selectable time specified in the control frame Such a frame (or its equivalent in other standards) will hereinafter be described as a 'pause frame'

SUMMARY OF THE INVENTION

The present invention particularly concerns a versatile bandwidth controller by means of which at a particular port the bandwidth available for reception of packets and the forwarding of packets can be either separately or conjointly controlled The former, called herein the duplex mode, would be more suitable when the transmission link is duplex (allowing simultaneous transmission and reception) and the latter would be more suitable when the transmission link were half-duplex (not allowing simultaneous transmission and reception) For this reason the two modes will be termed 'duplex' and 'half-duplex' but it is not essential that the mode of the bandwidth controller be the same as that of the link The link may be a duplex link but the bandwidth controller could be in a half-duplex mode if desired To this end a preferred embodiment of the invention employs two token buckets which can be configured so that the transmission and reception bandwidths may, according to the selected mode be controlled separately or conjointly Preferably prevention of transmission and restriction of reception of packets may, according to the mode of the bandwidth controller, be subject to a single threshold or respective thresholds Flow control, namely the sending of pause frames over a link and responding to pause frames, is commonly employed to relieve congestion in a switch The sending of pause frames over a link is inherently a manner of bandwidth control The present invention provides bandwidth control which is not dependent on congestion within a switch but can be imposed externally by a network administrator using conventional control frames It will be understood that in the present invention, as in many other counting systems subject to a threshold, the significance of the terms 'above' and 'below' a threshold depends on the relationship (which may be arbitrary) between the threshold and the direction of counting associated with an increase in traffic In the specific example described later, the passage of excess traffic is indicated by a net count below a threshold, but a converse convention could be employed Stated alternatively the token buckets could be constituted by 'leaky' buckets For this reason the term 'in-profile' is employed herein to indicate a count which will allow more traffic and 'out-of profile' is employed to indicate a count which will cause inhibition of traffic Other features of the invention will become apparent from the following description, with reference to the accompanying drawings

Figure 1:
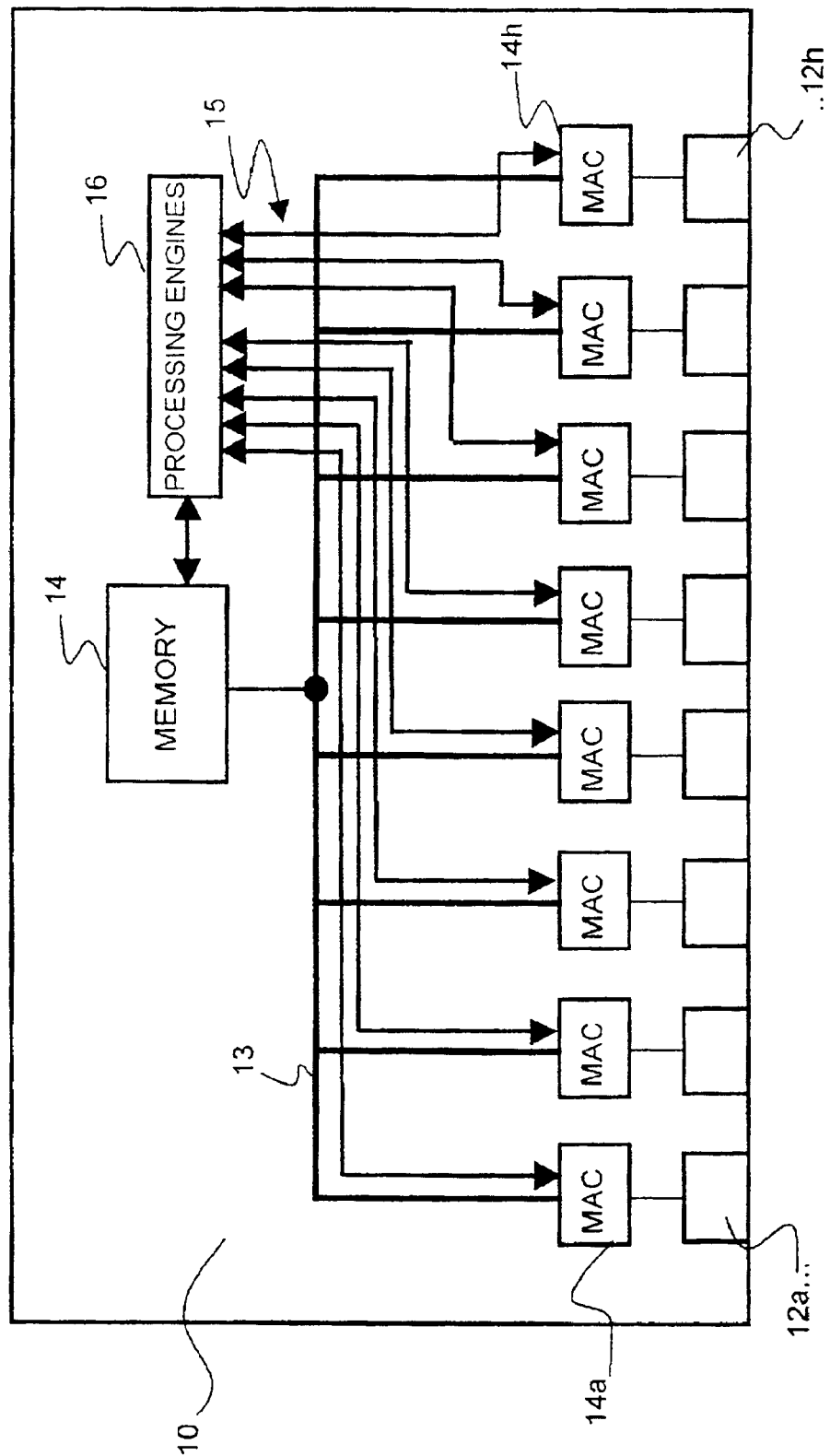
FIG. 1 is a general schematic illustration of a switch unit within which the present invention maybe incorporated
Figure 2:
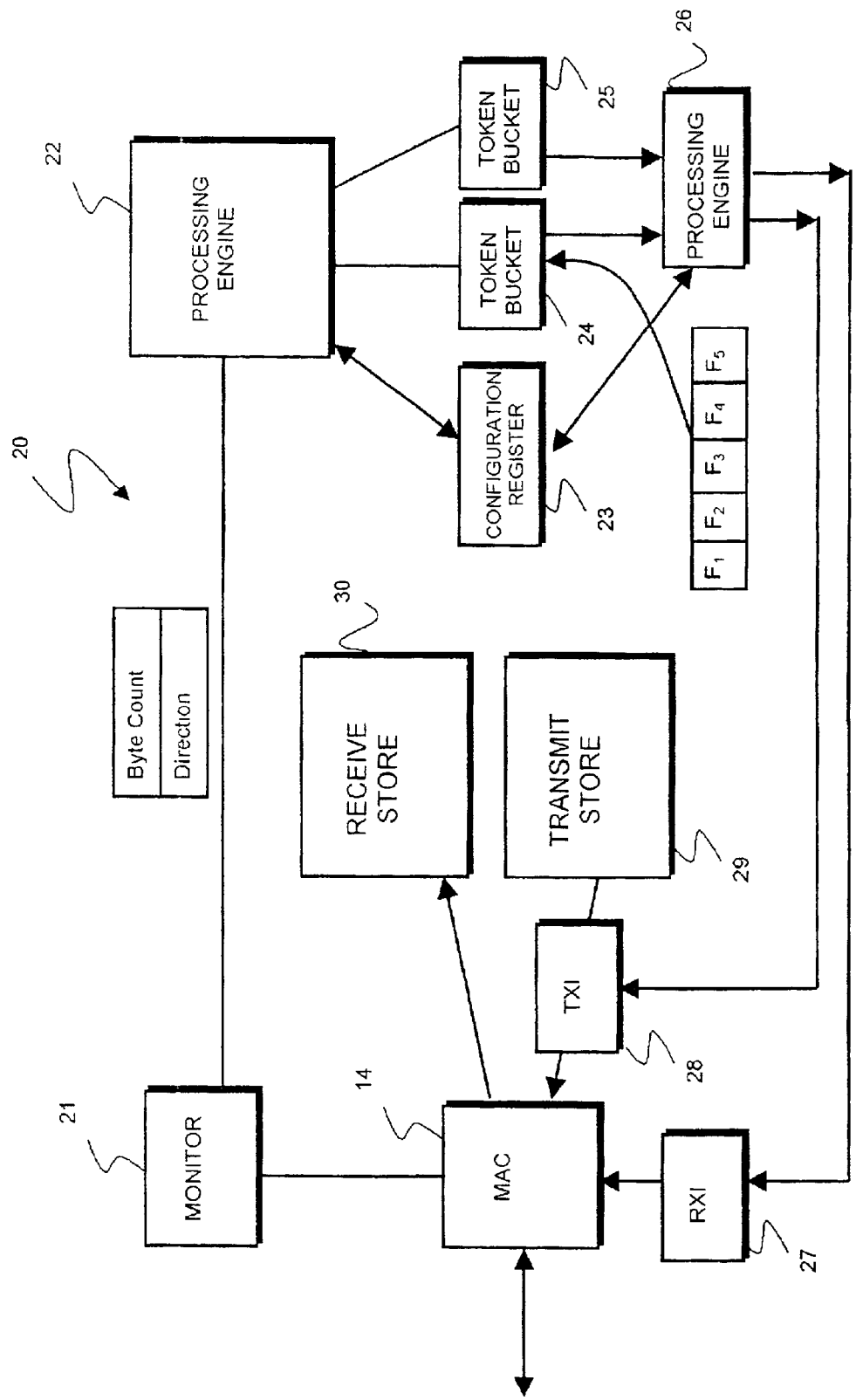
FIG. 2 is a schematic diagram illustrating one embodiment of the present invention A typical context for the present invention is a multiport switch of the kind which is illustrated in FIG. 1 The particular architecture of the switch or other unit within which the invention may be incorporated is not important The present invention will be described in relation to 'Ethernet' networks and more particularly those conforming to IEEE Standard 802 3, though such a restriction is not crucial to the present invention A switch 10 as shown in FIG. 1 typically has a multiplicity of ports, 11a to 11h These ports may be in known form for coupling to transmission media Each port is associated with a respective media access control device (MAC) 14a to 14h likewise in known form For present purposes it may be presumed that the media access control devices conform to the requirements of IEEE Standard 802 3 They may be controllable to provide a multiplicity of transmission rates, such as 10/100/1000 Mbps Selection of a particular rate may be imposed by means of control frames or may be established by auto negotiation in a manner well known in itself (and described in the aforementioned IEEE Standard)

The remainder of the switch shown in FIG. 1 is shown in schematic form only Broadly, it comprises a bus system 13 by means of which data packets are sent for temporary storage in memory 14 and subsequently dispatched from memory to a destination port or ports A bus system 15 between the media access control devices and processing engines 16 is provided for signalling the processing engines and also exerting control over the individual MACs Such control is required for determining the destination of packets and derives from both control frames received by the switch and internal operations such as the performing of lookups on address data within the packets and so on The basis of the system 20 shown in FIG. 2 is that for a port (preferably but not necessarily each port of the switch in FIG. 1), the received and transmitted streams of traffic are controlled using one or two token buckets, depending on the mode The 'mechanism' (which may be software-based) is octet-based and can cater for bursty traffic patterns Preferably, there are two modes of operation One is a full duplex mode in which two token buckets are employed The first controls the traffic transmitted from the port by inhibiting the release from storage of packets intended for that port The second token bucket restricts the traffic received by the port, preferably by means of the dispatch of pause frames A second mode of operation is a half-duplex mode Here, a single token bucket is used to meter the combined traffic received and transmitted by the port The system configures the token buckets to detect situations where the relevant traffic is in excess of a chosen threshold Preferably the 'granularity' of the threshold for operation at 10 or 100 Mbps is at 1 Mbps intervals For ports which are operable at 1000 Mbps the granularity of the threshold could be greater, such as 10 Mbps While the traffic is below the threshold, a state termed herein 'in profile', then packets are received and/or transmitted normally without restriction by the token bucket system. If the relevant traffic exceeds the threshold, a state termed herein 'out of profile', then action is taken to stem the flow of traffic.

For the duplex mode, while the relevant token bucket indicates that the transmitted traffic is 'out of profile', then the MAC 14 is instructed to temporarily stop transmitting frames If the MAC is instructed to stop during the transmission of a frame, then (as is usual), the frame is transmitted normally Transmission of frames may be resumed when the token bucket indicates that the transmit traffic is once again 'in profile'

Also in the full duplex mode, while the respective token bucket indicates that the received traffic is 'out of profile', the MAC 14 is instructed to flow control incoming traffic using normal flow control methods, such as pause frames in accordance with pause frames This flow control can be disabled when the received token bucket indicates that the traffic is once again 'in profile'

When the system is in half-duplex mode, while the single token bucket indicates that the combined traffic is 'out of profile', the MAC 14 is instructed not only to temporarily stop transmitting frames but also to flow control incoming traffic as described above There follows a description of the elements shown in FIG. 2 The MAC 14 is a normal Ethernet media access control device The MAC 14 is coupled to a monitor 21 which, in accordance with known techniques, sends data all frames which are transmitted and received through the MAC. For each valid frame transmitted or received by the MAC, the frame size (in terms of byte count) and the direction (transmitted or received) is passed to a processing engine 22 The byte count and direction maybe transmitted as a data word having an appropriate operation code, one field denoting byte count and a smaller field (which may be a 1 byte field) indicating direction The processing engine 22 controls and reads configuration registers 23 (to be described) and two token buckets 24 and 25 Processing engine 22 will read the mode configuration in the configuration registers and update the appropriate token bucket Processing engine 26 also reads the mode configuration in the configuration registers and checks whether the token buckets 24 and 25 are above or below their respective counting thresholds The threshold, which may be 'hardwired' or set by software, defines a token count which is at the choice of the designer but would be somewhat greater than the maximum size of a packet expressed on terms of tokens As is described later, processing engine 26 asserts signals to a receive inhibit control (RXI) 27 and a transmit inhibit control (TXI) 28

Receive control 27, while the signal from processing engine 26 is asserted, inhibits the reception of more traffic by the MAC by generating a pause frame in accordance with the IEEE Standard 802 3 The duration specified in the pause frame is a matter of design choice The transmit control, while the signal from processing engine 26 is asserted, prevents the transmission of more traffic by the MAC by generating an inhibit that prevents frames being transferred from the transmit store 29 to the MAC If the signal from engine 26 is asserted while a packet is in transit, the inhibit would be applied to the next packet In this embodiment of the invention, frames received by the MAC are stored in a receive store 30 and frames which are intended for transmission from the port are stored in a transmit storage space 29 These may be, in accordance with known practice. buffer stores associated (temporarily or permanently) with the MAC for the particular port Alternatively they may be allotted storage space in memory 14

Each token bucket 24 and 25 is shown explicitly in FIG. 2, but may be constituted by relevant fields, as discussed below, in storage locations and be both defined and controlled by software, in accordance with the following description Each token bucket contains a number of 'tokens', namely a specific numerical count which is related to the relevant unit of measurement of traffic flow In this example it will be assumed that one token is equal to 1 byte The size of the fields and thereby of the counters can be reduced if a token is equivalent to a multiplicity of bytes This results in a loss of accuracy but for high speed measurement may be appropriate to avoid excessively large counters In a token bucket, at regular intervals new 'tokens' are added to the bucket, specifically a 'refresh count' A specific number of tokens are required to perform an operation, namely to send a packet or receive a packet When the operation is performed the requisite tokens are removed from the bucket The operation cannot be performed unless there are sufficient tokens in the bucket, i e the bucket count exceeds a threshold In the present example, each token bucket is defined by four fields These are illustrated for bucket 24 schematically as $F_1$ to $F_4$ along with a 'field' $F_5$ which represents the threshold As previously mentioned, this 'field' may be a hard-wired value but could be, like fields $F_1$ to $F_4$, set in a software controlled register A first field, the 'in-profile' field $F_1$ consisting of one bit, indicates whether the token bucket is 'in profile', if the bucket count is less than a specified threshold, or whether the token bucket is out of profile A second field $F_2$, 'bucket size', having in this example three bits is a configurable value specifying the maximum number of tokens allowed in the bucket (typically values from 512 to 64k tokens) These values determine the maximum 'burst' of data which can be allowed before the token bucket becomes 'out of profile'

The third field $F_3$ is a 'refresh count', a seven bit field which indicates the number of tokens that are to be added to the bucket for each refresh interval The refresh interval may be fixed or variable but in the present embodiment it is assumed that the refresh interval is fixed and is determined by a selected clock from the processing engine 22 to the token bucket The fourth field $F_4$ of the token bucket is the 'bucket count' herein defined by a sixteen bit field, representing the current count of tokens in the bucket The count is reduced by incoming packets and is increased by the 'refresh count' every refresh interval, typically 8 microseconds In the present example, the system includes a configuration register 23 which is controlled according to whether the mode of operation of the port is duplex or half-duplex The configuration register may be put in this mode as a result of the auto negotiation performed but it is readily possible, since the configuration registers may be set by software, to impose the configuration and the other fields on the token buckets by means of management frames sent to the port Whichever scheme is adopted for the control of the configuration registers and the token buckets, the configuration register 23 in combination with processing engine 26 determines two distinct modes of operation for the token buckets, namely full duplex mode and half-duplex mode In the duplex mode, the restriction of transmission of packets and the inhibition of reception of packets are separately controlled by the token buckets 24 and 25 Thus an 'in profile/out of profile' signal from token bucket 24 determines the command signal to transmit control 28 whereas the 'in profile/out of profile' signal from the token bucket 25 determines the command signal to receive control 27 More particularly, while the 'transmit' token bucket 24 indicates that the transmitted traffic is 'out of profile', control 28 prevents transfer of frames from transmit storage 29 to the port In practice transmit control 28 instructs MAC 20 not to accept frames from transmit storage 29 As a practical matter, if the MAC is instructed to stop during the transmission of the frame, then that particular frame is transmitted normally and cessation of transmission seizes for the next frame Transmission will be resumed when the 'transmit' token bucket indicates that the transmit traffic is once again 'in profile'

Also in the full duplex mode, while the 'receive' token bucket indicates that the receive to traffic is 'out of profile', then receive control 27 commands the MAC to produce pause frames as previously described Flow control will be disabled when the receive token bucket indicates that the receive traffic is once again 'in profile'

The action of the processing engine to control the signalling of controls 27 and 28 is predetermined by the configuration register 23

For the sake of example, when the token bucket is first started, the 'bucket count' may be set to the in profile threshold (such as 0x0800 tokens) Alternatively if an initial burst of traffic is acceptable, 'bucket count' could be set to a maximum for the chosen bucket size, e g 0xFFF Every 8 microseconds, refresh tokens may be added to the bucket count There are two options here Option (a) requires that refresh tokens will be added to the bucket count and if the bucket count increases above the 'bucket size' the bucket count is set to the bucket size Option (b) requires that only if the bucket count is less than the bucket size, the refresh count tokens are added to the bucket count Either option ensures that the bucket count does not wrap around to a low number When a packet completely arrives, the respective number of tokens is calculated If the bucket count is greater than the in profile threshold, the calculated number of tokens is subtracted from the bucket count If the new bucket count is equal to or less than the in profile threshold, the bucket is Judged 'out of profile' and the appropriate traffic inhibiting signals will be produced Otherwise the bucket count will not be changed In the full duplex mode, the bandwidth occupancy which is controlled will be the sum of the traffic to and from the port However, for a variety of purposes that control may be too restrictive and the benefit of the present invention lies in the choice between that full duplex mode and the half-duplex mode In the half-duplex mode configuration register 23 sets processor 22 to cause accumulation of the byte count, irrespective of direction, in one of the token buckets, for example token bucket 24 Configuration register 23 also controls processing engine 26 so that when the threshold for token bucket 24 is exceeded, commands are sent both to transmit control 28 and receive control 27 so as to ensure that the MAC is instructed both to temporarily stop transmitting frames and also to exert flow control on the incoming traffic The present invention, by providing two token buckets which can control both transmitted and received bandwidth occupancy separately or as combined provides a more versatile system for scaleable control of bandwidth and in the prior art Degrees of sophistication are feasible For example, it is not necessary that the thresholds in buckets 24 and 25 be the same The configuration register could provide a choice between the token buckets to be used for the full duplex mode.

What is claimed is:

1. A system for the control of occupancy of available bandwidth for data frames both received and transmitted by way of a port, said system comprising:
   a media access control device associated with the port;
   means coupled to the media access control device for monitoring frame traffic passing through the port, and providing signals denoting for each frame the size of the frame and its direction relative to the port;
   first and second counting buckets for determining whether said traffic is in profile or out of profile;
   a transmit control responsive to a first command signal to prevent the supply of transmit frames to the media access control device and said port;
   a receive control coupled to the media access control device and responsive to a second command signal to initiate the generation of flow control frames from the port; and
   mode control means for controlling a relationship between the first and second counting buckets and said command signals, said mode control means defining a duplex mode wherein said token buckets separately control the first and second command signals and a half-duplex mode wherein a single one of said token buckets controls both said first and second command signals.

2. A system according to claim 1 further comprising transmit storage space for storing frames destined for transmission from said port, the transmit control preventing the transfer of frames from the transmit storage to the port.

3. A system according to claim 1 wherein the receive control initiates a pause frame to be transmitted from the port.

4. A system for the control of occupancy of available bandwidth for data frames both received and transmitted by way of a port, said system comprising:
   a media access control device associated with the port;
   means coupled to the media access control device for monitoring frame traffic passing through the port, and providing signals denoting the volumes of frame traffic to and from said port;
   first and second token buckets responsive to said signals and to token signals and each including a threshold separating an in profile condition and an out of profile condition;
   a transmit control responsive to a first command signal to prevent the supply of transmit frames to the media access control device and port;
   a receive control coupled to the media access control device and responsive to a second command signal to initiate the generation of flow control frames from the port; and
   mode control means for controlling a relationship between the token buckets and said command signals, said mode control means defining a duplex mode wherein said token buckets separately control the first and second command signals and a half-duplex mode wherein a single one of said token buckets controls both said first and second command signals.

* * * * *